(12) United States Patent
Meunier et al.

(10) Patent No.: US 10,984,638 B1
(45) Date of Patent: Apr. 20, 2021

(54) SYSTEMS, DEVICES, AND METHODS FOR ENCODING HAPTIC TRACKS

(71) Applicant: Immersion Corporation, San Jose, CA (US)

(72) Inventors: David Meunier, Montreal (CA); Sagi Sinai-Glazer, Westmount (CA); Shadi Asfour, Montreal (CA)

(73) Assignee: IMMERSION CORPORATION, San Francisco, CA (US)

( * ) Notice: Subject to any disclaimer, the term of this patent is extended or adjusted under 35 U.S.C. 154(b) by 0 days.

(21) Appl. No.: 16/655,795

(22) Filed: Oct. 17, 2019

(51) Int. Cl.
*G08B 6/00* (2006.01)
*G06F 3/01* (2006.01)
*H04N 21/43* (2011.01)

(52) U.S. Cl.
CPC ............... *G08B 6/00* (2013.01); *G06F 3/011* (2013.01); *G06F 3/016* (2013.01); *H04N 21/4307* (2013.01)

(58) Field of Classification Search
None
See application file for complete search history.

(56) References Cited

U.S. PATENT DOCUMENTS

| | | | | |
|---|---|---|---|---|
| 2011/0032088 A1* | 2/2011 | Kim | .................. | G06F 3/016 340/407.1 |
| 2013/0038792 A1* | 2/2013 | Quigley | ................. | A61H 19/44 348/515 |
| 2014/0125467 A1* | 5/2014 | Da Costa | ................. | G06F 3/016 340/407.1 |
| 2014/0270681 A1* | 9/2014 | Sen | ..................... | H04N 21/4126 386/201 |
| 2014/0347177 A1* | 11/2014 | Phan | ................... | H04N 21/4382 340/407.1 |
| 2015/0154966 A1* | 6/2015 | Bharitkar | ................. | G08B 6/00 381/23 |
| 2017/0301195 A1* | 10/2017 | Da Costa | ................. | G06F 3/016 |
| 2018/0005497 A1* | 1/2018 | Venkatesan | .............. | G08B 6/00 |
| 2020/0057502 A1* | 2/2020 | Harvey | ................. | G06F 3/0412 |

* cited by examiner

*Primary Examiner* — Fernando Alcon
(74) *Attorney, Agent, or Firm* — Medler Ferro Woodhouse & Mills PLLC

(57) ABSTRACT

Systems, devices, and methods for encoding haptic tracks are provided. A method includes receiving the haptic track, and identifying, within the haptic track, at least one of first portions of the haptic track that are representative of haptic silences or second portions that are representative of haptic effects. The method includes segmenting the haptic track into haptic silence chunks associated with one or more of the first portions that are sequentially positioned in the haptic track and haptic effects chunks associated with one or more of the second portions that are sequentially positioned in the haptic track. The method includes generating an encoded haptic track comprising at least one of a haptic silence block or a haptic effect block. The method includes outputting the encoded haptic track for playback. Numerous other aspects are provided.

20 Claims, 10 Drawing Sheets

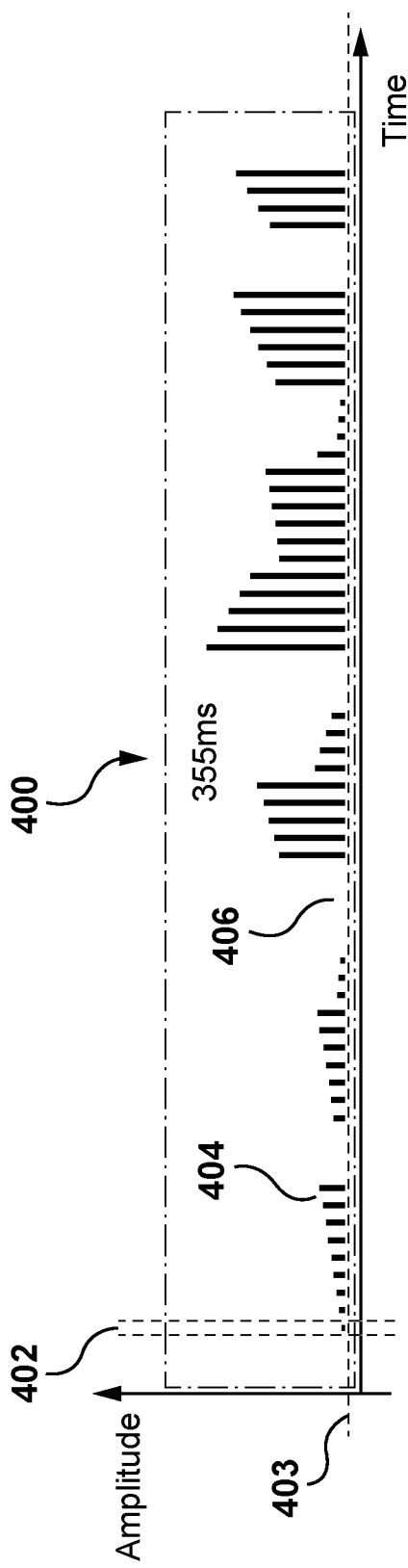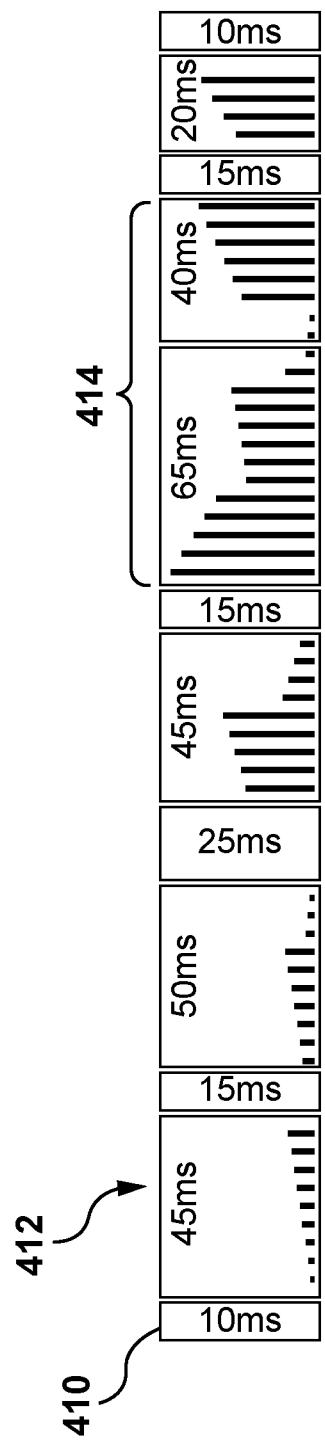
FIG. 4A
FIG. 4B

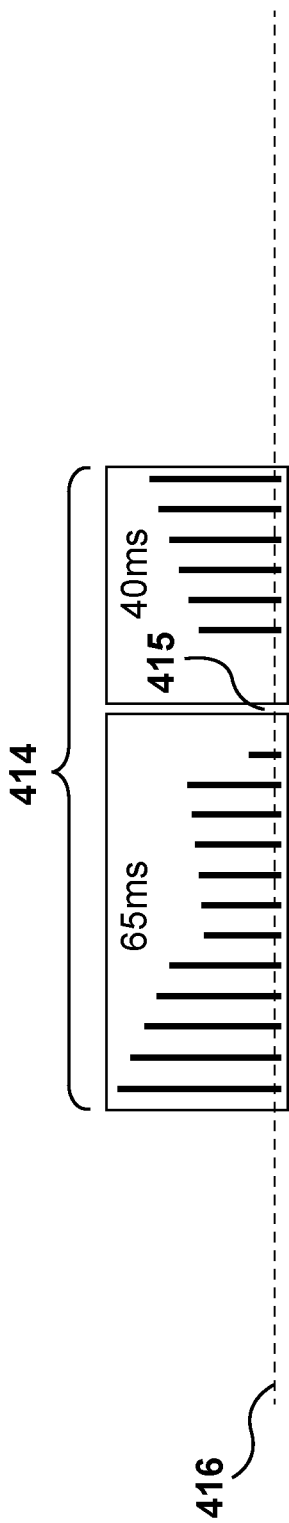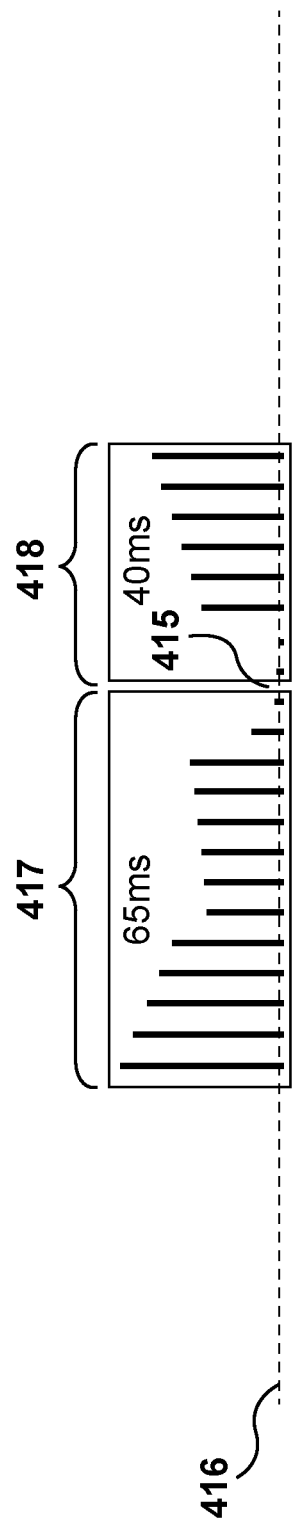

SYSTEMS, DEVICES, AND METHODS FOR ENCODING HAPTIC TRACKS

FIELD

Embodiments hereof relate to systems, devices and methods for encoding haptic tracks.

BACKGROUND

Haptic effects, alone or in combination with traditional media formats, including audiovisual formats, provide an enhanced user experience. Haptic tracks can be combined with audiovisual streams to enhance the user experience with streaming media, whether it be live streaming media or pre-recorded streaming media. Client haptic devices include one or more haptic actuators to deliver the haptic effects of a haptic track to a user. Different models of client haptic devices, however, may include different sets of actuators and therefore different output capabilities. Output capabilities may differ in terms of the haptic effects that are available, the magnitude of output, the bandwidth of output, and other characteristics of haptic effects.

Differences in output capabilities of various models of playback devices and haptic devices can lead to difficulties in designing haptic tracks. For example, different playback devices and haptic devices may decode haptic tracks differently. This may cause erroneous or unintended haptic effects to be introduced during the decoding of a haptic track.

These and other drawbacks exist with conventional haptically enabled devices. These drawbacks are addressed by embodiments described herein.

BRIEF SUMMARY

Embodiments of the present disclosure include systems, devices, and methods for encoding haptic tracks. The haptic tracks are encoded to improve and/or optimize transmission and/or playback of the encoded haptic track. The haptic tracks are encoded into one or more haptic silence blocks and one or more haptic effect blocks so that extraneous and/or unintended gaps or silences are not produced during the encoding.

In one aspect, the present disclosure provides a method for encoding haptic tracks. The method includes receiving a haptic track. The haptic track includes a plurality of haptic effects represented by a haptic signal configured to cause a haptic output device to output the plurality of haptic effects over time. The method also includes identifying, within the haptic track, at least one of first portions of the haptic track that are representative of haptic silences or second portions that are representative of the plurality of haptic effects. Additionally, the method includes segmenting the haptic track into haptic silence chunks associated with (e.g., corresponding to) one or more of the first portions that are sequentially positioned in the haptic track and haptic effects chunks associated with (e.g., corresponding to) one or more of the second portions that are sequentially positioned in the haptic track. Further, the method includes generating an encoded haptic track having at least one of a haptic silence block or a haptic effect block. In aspects, the haptic silence block is representative of at least a portion of a haptic silence chunk from the haptic silence chunks. The haptic effect block is representative of at least a portion of a haptic effect chunk from the haptic effect chunks. The method includes outputting the encoded haptic track for playback.

In another aspect, a system for encoding haptic tracks includes a memory unit including software instructions and at least one processor configured to execute the software instructions to perform a method encoding the haptic tracks. The method includes receiving a haptic track. The haptic track includes a plurality of haptic effects represented by a haptic signal configured to cause a haptic output device to output the plurality of haptic effects over time. The method also includes identifying, within the haptic track, at least one of first portions of the haptic track that are representative of haptic silences or second portions that are representative of the plurality of haptic effects. Additionally, the method includes segmenting the haptic track into haptic silence chunks associated with (e.g., corresponding to) one or more of the first portions that are sequentially positioned in the haptic track and haptic effects chunks associated with (e.g., corresponding to) one or more of the second portions that are sequentially positioned in the haptic track. Further, the method includes generating an encoded haptic track having at least one of a haptic silence block or a haptic effect block. In aspects, the haptic silence block is representative of at least a portion of a haptic silence chunk from the haptic silence chunks. The haptic effect block is representative of at least a portion of a haptic effect chunk from the haptic effect chunks. The method includes outputting the encoded haptic track for playback.

In another aspect, the present disclosure provides a method for decoding haptic tracks. The method includes receiving an encoded haptic track. The haptic track includes at least one of a haptic silence block or a haptic effect block. The haptic silence block is representative of at least a portion of a haptic silence chunk, and the haptic effect block is representative of at least a portion of a haptic effect chunk. The haptic silence chunk representing a portion of a haptic track before encoding that is associated with one or more of haptic silence portions of the haptic track before encoding that are sequentially positioned in the haptic track. The haptic effect chunk representing a portion of the haptic track before encoding that is associated with one or more of haptic effect portions of the haptic track before encoding that are sequentially positioned in the haptic track. The method further includes decoding the encoded haptic track at a playback system to generate a haptic signal associated with the haptic track. The method also includes outputting the haptic signal to a haptic output device. Numerous other aspects are provided

BRIEF DESCRIPTION OF DRAWINGS

The foregoing and other features and advantages of the present invention will be apparent from the following description of embodiments hereof as illustrated in the accompanying drawings. The accompanying drawings, which are incorporated herein and form a part of the specification, further serve to explain the principles of various embodiments described herein and to enable a person skilled in the pertinent art to make and use various embodiments described herein. The drawings are not to scale.

FIGS. 4A-4E are diagrams illustrating an example of encoding portions of a haptic track during the operation of the encoding system of FIG. 3, according to an embodiment in accordance herewith.

DETAILED DESCRIPTION

Specific embodiments of the present invention are now described with reference to the figures. The following detailed description is merely exemplary in nature and is not intended to limit the present invention or the application and uses thereof. Furthermore, there is no intention to be bound by any expressed or implied theory presented in the preceding technical field, background, brief summary or the following detailed description.

Embodiments disclosed herein are directed to encoding, transmitting, and/or playback of encoded haptic tracks. A haptic system is configured to receive unencoded haptic tracks, encode the haptic tracks according to an encoding format that improves and/or optimizes decoding and playback on a playback system, and to transmit the encoded haptic tracks to the playback system. An encoding system is configured to receive the unencoded haptic tracks and identify portions of the haptic track as haptic silences and identify portions of the haptic track as haptic effects. The encoding system is configured to segment the haptic tracks into haptic silence chunks and haptic effects chunks based on the identification of haptic silences and haptic effects. The encoding system is configured to generate encoded haptic tracks by encoding the haptic silence chunks in haptic silence blocks that include (e.g., only include) haptic silence headers and by encoding the haptic effects in haptic effects blocks that include haptic effects header and haptic data. The encoding system is configured to transmit the encoded haptic tracks to the playback system for decoding and playback.

Figure 1:
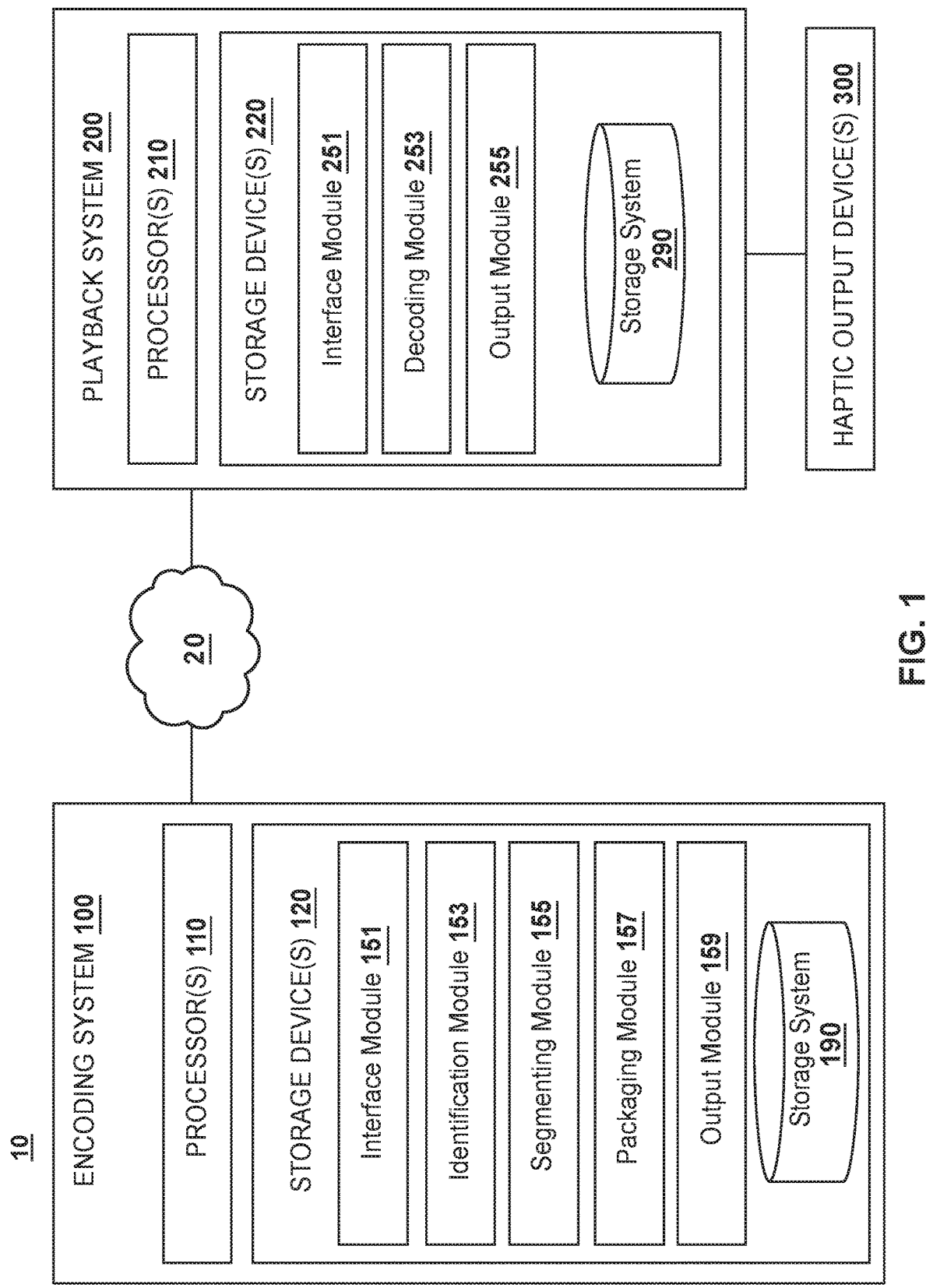
FIG. 1 illustrates a haptic system, according to an embodiment in accordance herewith.

FIG. 1 illustrates a haptic system 10 for encoding, transmitting, storing, and/or playback of haptic tracks in accordance with an embodiment hereof. One skilled in the art will realize that FIG. 1 illustrates one example of a haptic system and that existing components illustrated in FIG. 1 may be removed and/or additional components may be added to the haptic system 10 without departing from the scope of embodiments described herein.

The haptic system 10 includes an encoding system 100 and a playback system 200, in communication via a network 20. The haptic system 10 also includes one or more haptic output devices 300 communicating with (e.g., and/or contained within) the playback system 200. While FIG. 1 illustrates one encoding system 100 and one playback system 200, the haptic system 10 can include any number of encoding systems 100 and playback systems 200, and the haptic system 10 is not limited to including one of each. Embodiments described herein having specific numbers of encoding systems 100 and playback systems 200 are provided for illustrative purposes only and are not intended to be limiting.

As described herein, a haptic track includes a defined segment of haptic data or haptic signal(s) that, when played or executed, results in an output over a period of time of one or more associated haptic effects or intended haptic effects. As described herein, a haptic effect includes a physical effect and/or sensation that is to be produced by a haptic output device 300, e.g., a vibration, a change in surface texture, a change in temperature, and the like. As described herein, a haptic data or haptic signal includes data that instructs or causes the haptic output device 300 to generate the haptic effect. For example, the haptic data or haptic signal can include values for physical parameters such as voltage values, frequency values, current values, and the like. Likewise, the haptic data or haptic signal can include relative values that define a magnitude of the haptic effect. In an embodiment, the haptic track can include a number of haptic samples to be processed at a sampling rate, where each haptic sample includes a value that instructs or causes the haptic output device to generate the haptic effect.

In embodiments, the encoding system 100 is configured to encode haptic tracks for transmission, storage, decoding, and/or playback by the playback system 200 and/or the haptic output device(s) 300. When encoding haptic tracks, it is important that the original intent of the haptic tracks be maintained. For example, if a portion of a complete haptic effect is played with an unintended break due to encoding and decoding, then the haptic designer's intent for that effect may not be met. For example, a haptic track may include a series of vibration effects at different magnitudes punctuated by a final kinesthetic effect. Another example is a crescendo/decrescendo effect wherein a vibration effect increases in magnitude to a peak and then decreases in magnitude until it is complete. If the crescendo/decrescendo effect is encoded into two separate data blocks, a noticeable pause may be introduced during playback due to the playback hardware having to decode and interpret the separate data blocks. If a basic haptic element of the crescendo/decrescendo effect includes an unintended pause, it may compromise the intended haptic effect.

In embodiments, the encoding system 100 is configured to generate encoded haptic tracks that improve and/or optimize playback, transmission, and/or storage, while maintaining the intent of the haptic effects in the unencoded haptic track. The encoding system 100 identifies and segments the haptic tracks in a systematic manner to create one or more haptic silence chunks and one or more haptic effect chunks. The encoding system 100 then encodes (or "packages") the one or more haptic silence chunks and one or more haptic effects chunks into one or more haptic silence blocks and one or more haptic effect blocks to form an encoded haptic track. In an embodiment, one or more of the haptic silence blocks can include a haptic silence header and one or more of the haptic effect blocks can include a haptic effect header and haptic data. By encoding the haptic silences and haptic effects in separate blocks, the encoding system 100 can maintain the intent of the haptic effects of the haptic track once encoded. Likewise, by reducing haptic silences to only header information, the encoding performed by the encoding system 100 compresses the size of a haptic track for storage or transmission. For example, while 70% of a haptic track may be haptic silences, the encoding of the encoding system 100 can produce haptic silence blocks of uniform size regardless of the length of the haptic silences, e.g., the information required to encode a long silence is the same as a short silence. Thus, by reducing the amount of data required to represent a long haptic silence, the encoding system 100 can compress a haptic track without losing information. Additionally or alternatively, the encoding of the encoding system 100 is universal and can be applied to different types of haptic tracks. For example, because the encoding is variable rate and the rate is encoded directly in the signal (e.g., and can vary for a single haptic track), the encoding system 100 can effectively encode haptic effects of different fidelity such as standard definition (SD) and high definition (HD) effects. These advantages will become further apparent in the description below.

The encoding system 100 can be configured as a server (e.g., having one or more server blades, processors, etc.), a personal computer (e.g., a desktop computer, a laptop computer, etc.), a smartphone, a tablet computing device, and/or other device that can be programmed to receive and encode haptic effects. In an embodiment, any or all of the functionality of the encoding system 100 can be performed as part of a cloud computing platform. In an embodiment, any or all of the functionality of the encoding system 100 can be performed by another system, such as the playback system 200.

The encoding system 100 includes one or more processors 110 (e.g., also interchangeably referred to herein as processors 110, processor(s) 110, or processor 110 for convenience), one or more storage device(s) 120, and/or other components. The processor 110 is programmed by one or more computer program instructions stored on the storage device 120. For example, the processor 110 is programmed by an interface module 151, an identification module 153, a segmenting module 155, a packaging module 157, and an output module 159. Additionally, the storage device 120 stores a storage system 190. As used herein, for convenience, the various modules and systems will be described as performing an operation, when, in an embodiment, the modules and systems program the processor 110 (and therefore the encoding system 100) to perform the operation. For example, the operations and functionality of the modules and system can be embodied in software that is executed by the processor 110. In another embodiment, the operations and functionality of the modules and system can be embodied in software, hardware, and combinations thereof. Further details and features of the encoding system 100 configured for implementing features of the described invention may be understood with respect to FIGS. 2-5 and 7.

In aspects, the playback system 200 is configured to receive the encoded haptic tracks and decode the encoded haptic tracks for playback. The playback system 200 can be configured as a personal computer (e.g., a desktop computer, a laptop computer, etc.), a smartphone, a tablet computing device, a smartwatch, video game controller or console, virtual reality (VR), augmented reality (AR), or mixed reality (MR) headset, and/or other device that can be programmed to receive haptic streams and output haptic effects. In an embodiment, any of the computing functionality of the playback system 200 can be performed as part of a cloud computing platform.

The playback system 200 includes one or more processors 210 (also interchangeably referred to herein as processors 210, processor(s) 210, or processor 210 for convenience), one or more storage device(s) 320, and/or other components. The processor 210 is programmed by one or more computer program instructions stored on the storage device 220. For example, the processor 210 is programmed by an interface module 251, a decoding module 253, and an output module 255. Additionally, the storage device 220 stores a storage system 290. As used herein, for convenience, the various instruction modules and systems will be described as performing an operation, when, in an embodiment, the modules and systems program the processor 210 (and therefore playback system 200) to perform the operation. For example, the operations and functionality of the modules and system can be embodied in software that is executed by the processor 210. In another embodiment, the operations and functionality of the modules and system can be embodied in software, hardware, and combinations thereof.

The playback system 200 also communicates with the haptic output device(s) 300. While FIG. 1 illustrates the haptic output devices 300 being separate from the playback system 200, any of the haptic output devices 300 can be a part of or integrated in the playback system 200. Further details and features of the playback system 200 configured for implementing features of the described invention may be understood with respect to FIGS. 6 and 8. The haptic output devices 300 can be or include any suitable output device known in the art. For example, the haptic output devices 300 can include thin film actuators, such as macro-fiber composite (MFC) actuators, piezoelectric material actuators, smart material actuators, electro-polymer actuators, and others. The haptic output devices 300 can further include inertial or kinesthetic haptic actuators, eccentric rotating mass ("ERM") haptic actuators in which an eccentric mass is moved by a motor, linear resonant haptic actuators ("LRAs") in which a mass attached to a spring is driven back and forth, vibrotactile haptic actuators, shape memory alloys, and/or any combination of haptic output devices described above.

The network 20 includes any type of communication channel or network for transmitting data between the encoding system 100 and the playback system 200. In an embodiment, the network 20 can include one or more communication networks such as local area networks and wide area network, e.g., the Internet. In another embodiment, the network 20 can include inter-device communication channels such as data buses, e.g., serial, wireless communication channels, e.g., WIFI, Bluetooth, and the like.

Additionally, while FIG. 1 illustrates the encoding system 100, the playback system 200, and the haptic output devices 300 being separate systems, one skilled in the art will realize that any of the encoding system 100, playback system 200, and/or the haptic output devices 300 may be embodied in a single system and/or device.

Storage devices, as discussed herein, include non-transitory computer readable media, and any media or computer memory that stores data and/or instructions that cause a machine to operate in a specific fashion. Such non-transitory media may include non-volatile media and/or volatile media. Non-volatile media includes, for example, optical or magnetic disks, as well as various forms of solid state media. Volatile media includes dynamic memory. Common forms of non-transitory media include, for example, a floppy disk, a flexible disk, hard disk, solid state drive, magnetic tape, or any other magnetic data storage medium, a CD-ROM, DVD, Blu-Ray, any other optical data storage medium, any physical medium with patterns of holes, a RAM, a PROM, and EPROM, a FLASH-EPROM, NVRAM, any other memory chip or cartridge, and networked versions of the same.

Figure 2:
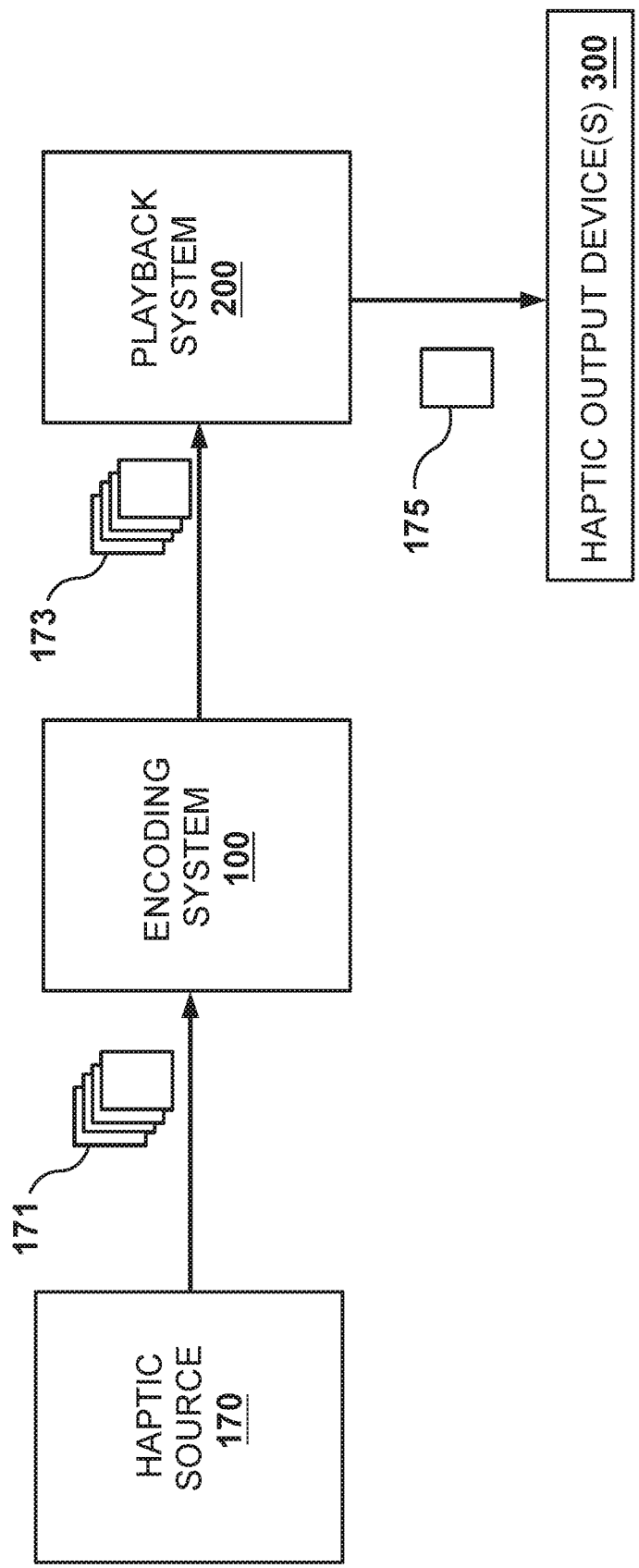
FIG. 2 is a diagram illustrating operation of the haptic system of FIG. 1, according to an embodiment in accordance herewith.

FIG. 2 is a diagram illustrating an operation of the haptic system 10 for encoding, transmitting, and/or playback of haptic tracks in accordance with an embodiment hereof. One skilled in the art will realize that FIG. 2 illustrates one example of the operation of a haptic system and that existing components illustrated in FIG. 2 may be removed and/or additional components may be added to the haptic system 10, and existing operations may be removed and/or additional operations may be added to the operations illustrated.

The encoding system 100 receives one or more haptic tracks 171 from a haptic source 170 such as a user, a memory or storage device storing one or more haptic tracks, other computer systems and devices (e.g., content streaming system/device, media streaming system/device, haptic authoring system/device), and/or combinations thereof. The encoding system 100 encodes the one or more haptic tracks 171 to generate one or more encoded haptic tracks 173. The encoding system 170 then transmits the one or more encoded haptic tracks 173 to a playback system 200. In some embodiments, the encoding system 100 can transmit the one or more encoded haptic tracks 173 to the playback system 200. In some embodiments, the encoding system 100 can store the one or more encoded haptic tracks 173 in memory or on a storage device (whether local or remote) for later transmission to the playback system 200 and/or retrieval by the playback system 200.

As explained in greater detail below with respect to FIGS. 3-5, the encoding system 100 examines contents (e.g., haptic data) of the haptic tracks 171 and identifies one or more first portions of the haptic data (e.g., haptic samples) of the haptic tracks 171 that are sequentially positioned and include silent periods ("haptic silence chunks"). The encoding system 100 also identifies one or more second portions of the haptic tracks 171 that are sequentially positioned and include non-silent or haptic effect periods ("haptic effect chunks"). As described herein, one or more haptic silence chunks include portions of the haptic tracks 171, which are sequentially positioned, in which the haptic effect represented in the haptic data does not satisfy (e.g., falls below) a haptic effect threshold (or are absent) indicating the absence of a haptic effect. As described herein, the one or more haptic effect chunks include portions of the haptic tracks 171, which are sequentially positioned, in which the haptic effect represented in the haptic data satisfies (e.g., meets or exceeds) the haptic effect threshold, indicating the presence of a haptic effect. The encoding system 100 then encodes (e.g., or packages) the haptic silence chunks and the haptic effect chunks to generate encoded haptic tracks 173 according to an encoding format. The encoding format of the encoded haptic tracks 173 includes haptic silence blocks including haptic silence headers, and haptic effect blocks including haptic effect headers and haptic data. In embodiments, an encoded haptic track 173 can include haptic silence blocks, haptic effect blocks, or combinations of both depending on haptic data in a haptic track 171, (e.g. whether the haptic track 171 includes haptic silence chunks, haptic effect chunks, or both.) For example, an encoded haptic track 173 can include haptic silence blocks, haptic effect blocks, or both haptic silence blocks and haptic effect blocks.

The playback system 200 receives the one or more encoded haptic tracks 173 and decodes the one or more encoded haptic tracks 173. From the decoding, the playback system 200 provides a haptic signal 175 for the haptic output devices 300. In an embodiment, the playback system 200 reads the haptic silence blocks and the haptic effect blocks of the encoded haptic tracks 173 and generates the haptic signal 175 from the haptic silence blocks and the haptic effect blocks. In some embodiments, the playback system 200 can transmit the haptic signal 175 to the haptic output devices for playback by the haptic output devices 300. In some embodiments, the playback system 200 can store the haptic signal 175 in memory or storage devices (whether local or remote) for later transmission to the haptic output devices 300 and/or retrieval by the haptic output devices 300.

As described above, the encoding system 100 can transmit the encoded haptic tracks 173 to the playback system 200. In an embodiment, the encoding system 100 and the playback system 200 may be separate systems or devices. For example, the encoding system 100 can be embodied in or as part of separate computer systems and/or devices that are remotely located from the playback system 200. For instance, the encoding system 100 can be part of a media (e.g., or content) streaming system that streams the encoded haptic tracks 173 to the playback system 200, which can be part of a media (e.g., or content) playback device, such as a cable or satellite receiver, a personal computer, tablet computer, a mobile phone, a game console, and the like. In this embodiment, the encoding system 100 can transmit the encoded haptic tracks 173 to the playback system 200 over one or more communication channels. The communication channels can include one or more communication networks such as local area networks, wide area networks, e.g., the Internet, and the like. In this embodiment, the encoded haptic tracks 173 can be stored in a memory and/or storage device at the encoding system 100 (e.g., or a remote memory and/or storage device) and retrieved by or transmitted to the playback system 200.

In another embodiment, the encoding system 100 and the playback system 200 may be embodied in or as part of a single system or device. In this embodiment, the transmission of the encoded haptic tracks 173 can occur between the hardware components and/or software components of the playback system over communication channels local to the single system or device. For example, the communication channels can include serial buses, Bluetooth, WIFI, NFC, or any other communication technology, for communicating (e.g., wired or wirelessly) the allows communications between the encoding system 100 and the playback system 200. In this embodiment, the haptic output devices 300 can also be embodied in or part of the single system or device.

In another embodiment, the playback system 200 (e.g., or the functionality of the playback system 200) may be embodied in or as part of the haptic output devices 300. In this embodiment, the encoding system 100 can directly transmit the encoded haptic tracks 173 to the haptic output devices 300. Likewise, the haptic output device 300 can retrieve the encoded haptic tracks 173 from the encoding system 100, e.g., from memory and/or storage device, or from other computer system and devices. In this embodiment, the haptic output devices 300 can perform the decoding of the encoded haptic tracks 173, as described herein.

In embodiments, the encoded haptic track 173 may be stored on a memory device local to the playback system 200 and/or to the haptic output devices 300. For example, the encoded haptic track 173 may be transmitted or otherwise conveyed to the playback system 200, which may cause the storage of the haptic track 173 on a local memory device for later playback. In embodiments wherein the encoding system 100 and the playback system 200 are local to one another, the encoding system 100 may cause the storage of the encoded haptic track 173 on a local memory device for later access by the playback system 200.

Figure 3:
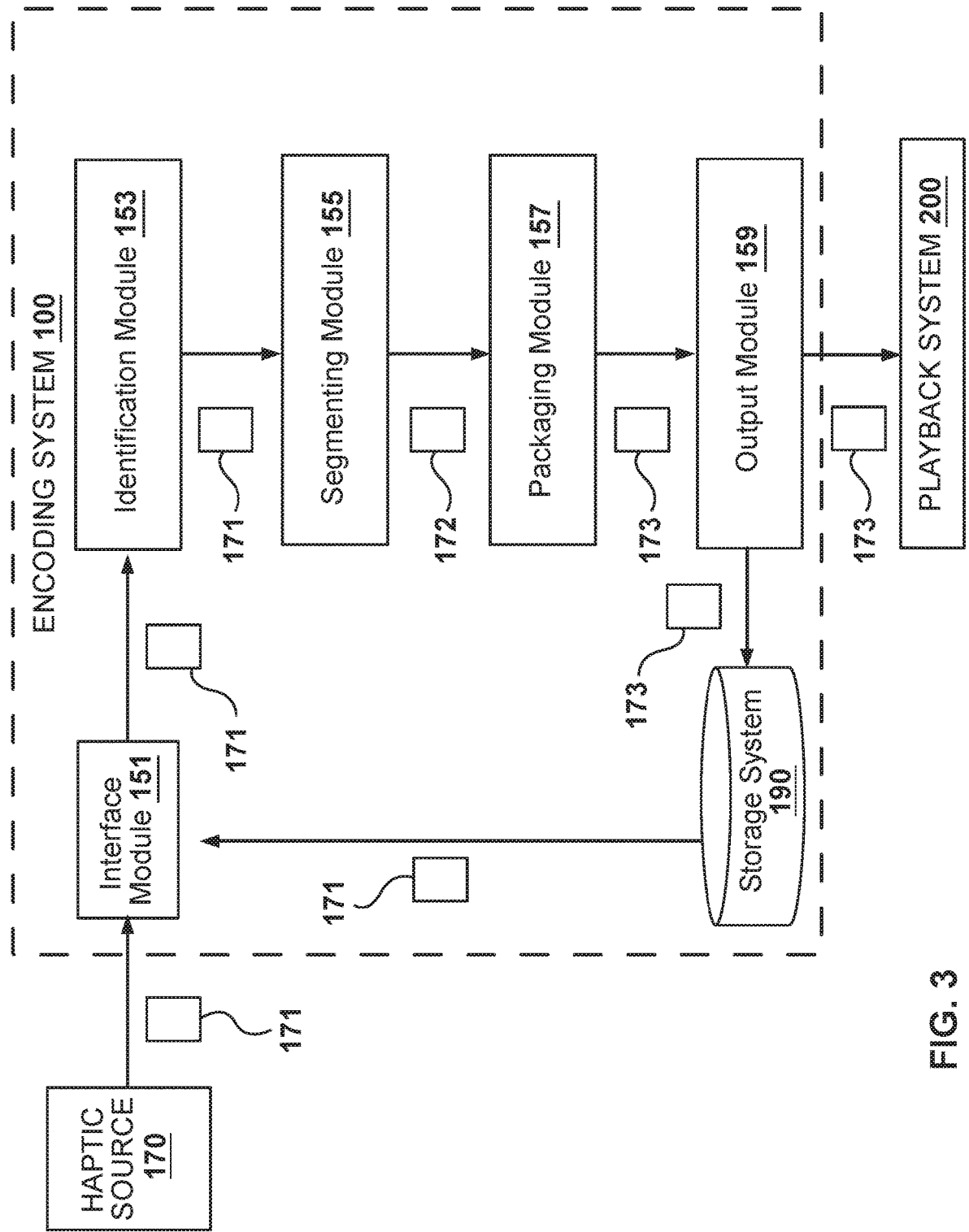
FIG. 3 is a diagram illustrating operation of an encoding system in the haptic system of FIG. 1, according to an embodiment in accordance herewith.

FIG. 3 is a diagram illustrating the operation of the encoding system 100 in accordance with an embodiment hereof. One skilled in the art will realize that FIG. 3 illustrates one example of the operation of an encoding system and that existing components illustrated in FIG. 3 may be removed and/or additional components may be added to the encoding system 100, and existing operations may be removed and/or additional operations may be added to the operation illustrated.

As illustrated in FIG. 3, the encoding system 100 is configured to receive the haptic track 171 from one or more haptic sources 170, via the interface module 151. The one or more haptic sources 170 can include any source that provides, produces, and/or transmit haptic tracks 171. For example, the one or more haptic sources 170 can include a user device that transmits, generates, and/or authors the haptic tracks 171. Likewise, for example, the one or more haptic sources 170 can include a haptic authoring system that generates haptic tracks for use in other applications, software, or devices. Additionally, for example, the one or more haptic sources 170 can include storage devices or systems that store the haptic tracks 171, such as one similar to the storage system 190.

The interface module 151 can be configured to interface and communicate with the one or more haptic sources 170 to receive and/or retrieve the haptic tracks 171. For example, the interface module 151 can include a user interface in which a user and/or user device can provide the haptic tracks 171. Likewise, for example, the interface module 151 can include an application programming interface ("API") that can be called by other modules, software, application, and devices to invoke the operations of the encoding system 100. Additionally, for example, the interface module 151 can include a communication interface for communicating with the one or more haptic sources 170 over a network or other communication channel using any suitable transmission protocol including, e.g., HTTP, TCP, UDP, etc. Also, for example, the interface module 151 can include a database and/or storage interface for retrieving the haptic tracks 171 from a storage system, storage device, and/or data structure.

As described herein, a haptic track 171 includes haptic data (e.g., a haptic signal) that instructs a haptic output device how to perform haptic effects over a period of time, as described above. FIGS. 4A-4E illustrate one example of a haptic track 400 (e.g., and encoding thereof) in accordance with an embodiment hereof. One skilled in the art will realize that FIGS. 4A-4E illustrate one example of a haptic track and that the haptic tracks 171 may be include any format or configuration of haptic data.

As illustrated in FIG. 4A, the haptic track 400 is configured to generate a vibration haptic effect in the one or more haptic output devices 300. A haptic sample 402 of the haptic track is shown in FIG. 4A. The haptic track 400 includes a sequence of haptic samples that define a particular vibration haptic effect over a period of time, e.g., 355 milliseconds (ms). The haptic data of the haptic track 400 can include or determine an amplitude of the haptic effect, e.g., vibration magnitude. For example, the haptic data can be values of physical parameters, e.g., voltages, frequency, current, etc., to be applied to one or more components, e.g., actuator, of the haptic output devices 300. Likewise, for example, the haptic data can be relative values of the haptic effect, which can be converted to physical parameters by the haptic output devices 300. The haptic track 400 is composed of haptic data units to be processed at a sampling rate, e.g., time per haptic sample 402. That is, the haptic samples 402 can each have a time width, e.g., 5 ms. In aspects, a time period between samples is 5 ms. In an embodiment, the sampling rate can be constant for the haptic track 400. In another embodiment, the sampling rate can be variable for the haptic track 400.

Once received, the interface module 151 passes the haptic track 171 to the identification module 153. The identification module 153 is configured to examine and identify which portions of the haptic track 171 can be classified as a haptic silence and which portions of the haptic track 171 can be classified as a haptic effect. In an embodiment, the identification module 153 can identify the haptic silence and the haptic effect by comparing each haptic sample in the haptic track 171, e.g., comparing the haptic sample 402 to a haptic effect threshold. The haptic effect threshold represents a predetermined value of the haptic sample, e.g., the haptic sample 402, which can represent one or more portions of a haptic effect. For example, if the haptic data includes values of physical parameters, e.g., voltages, frequency, current, etc., the haptic effect threshold can be a value of the physical parameter that represent the absence of a haptic effect and/or a value of the physical parameter that is minimal relative to other values to be considered a haptic silence. Likewise, for example, if the haptic data includes relative values of magnitude of the haptic effect, the haptic effect threshold can be a value that is minimal relative to other values to be considered a haptic silence. In an embodiment, the predetermined value of the haptic effect threshold can be 0.0, 0.1, 0.2, or the like in magnitude.

To identify the haptic silences and the haptic effects, the identification module 153 can be configured to compare a value of each portion (e.g., haptic sample) of the haptic track 171 to the haptic effect threshold. If the value of a haptic sample in the haptic track 171 does not satisfy (e.g., falls below) a haptic effect threshold, the identification module 153 can classify the haptic sample as a haptic silence. If the value of a haptic sample in the haptic track 171 satisfies (e.g., meets or exceeds) the haptic effect threshold, the identification module 153 can classify the haptic sample as a haptic effect. For example, referring to FIG. 4A, the identification module 153 can compare the value of each of the haptic samples 402 to the haptic effect threshold 404 and classify each of the haptic samples 402 as a haptic effect 404 or a haptic silence 406. As illustrated in FIG. 4A, the encoding system 100 can utilize a haptic effect threshold 403 that defines an amplitude below which a sample is considered to be a haptic silence. For example, if the haptic track 400 includes vibration magnitude data, the haptic effect threshold 403 can be approximately 0.0 magnitude.

In embodiments, the haptic effect threshold can be variable. For example, the haptic effect threshold can be selected by a user. Likewise, for example, the encoding system 100 can alter the haptic effect threshold and/or select a new haptic effect threshold. Once skilled in the art will realize that the haptic effect threshold can be set to any value to classify portions of the haptic track as haptic silences and portions of the haptic track as haptic effects.

Once the haptic samples have been classified as a haptic silence 406 or a haptic effect 404, the identification module 153 is configured to pass the classification and the haptic track 171 to the segmenting module 155. The segmenting module 155 is configured to segment the haptic track 171 into haptic silence chunks and haptic effect chunks. The segmenting module 155 can group sequentially positioned haptic samples that are classified as haptic silences as a haptic silence chunk. The segmenting module can group the sequentially positioned haptic samples that are classified as haptic effects as a haptic effect chunk. For example, as illustrated in FIG. 4B, the first 10 ms of the haptic track 400, e.g., two (2) haptic samples 402 fail to satisfy (e.g., fall below) the haptic effect threshold 403, and the segmenting module 155 can splice these sequentially positioned segments (or portions) of the haptic track 400 into a haptic silence chunk 410. Likewise, the next 45 ms of the haptic track 400, e.g., nine (9) haptic samples 402 satisfy (e.g., meet or exceed) the haptic effect threshold 403, and the segmenting module 155 can splice these sequentially positioned segments (or portions) of the haptic track 400 into a haptic effect chunk 412.

Once the haptic silence chunks and the haptic effect chunks are created, the packaging module 157 is configured to encode (or "package") the haptic silence chunks and the haptic effects chunks into the encoded haptic track 173. To encode the haptic silence chunks and the haptic effect chunks, the packaging module 157 can be configured to utilize an encoding format that is based on the haptic silence chunks and haptic effect chunks. In an embodiment, the encoding format of the encoded haptic tracks 173 include haptic silence blocks and haptic effect blocks.

In an embodiment, each haptic silence block includes a haptic silence header that includes information which allows the haptic silence block to be reconstructed into the haptic signal represented by the haptic silence chunk. The haptic silence header can include a haptic silence identifier that identifies the block as a haptic silence block, a sample number that identifies the number of portions (e.g., samples) that are covered by the haptic silence block, and/or a sampling rate. The haptic silence header can include other information such as a block order identifier that identifies the position of the haptic silence block relative to other haptic silence blocks and haptic effect blocks, which can be used to order the blocks if transmitted, received, and/or stored out of order. The haptic silence header can include other information such as destination information that identifies a particular haptic output device 300 and/or component of the haptic output device, which is the intended target of the haptic silence block. One skilled in the art will realize that a haptic silence header can include any other information that identifies, orders, and/or directs the haptic silence block.

In an embodiment, each haptic effect block includes a haptic effect header that includes information which allows the haptic effect block to be reconstructed into the haptic signal represented by the haptic effect chunk. The haptic effect header can include a haptic effect identifier that identifies the block as a haptic effect block, a sample number that identifies the number of portions (e.g., samples) that are covered by the haptic effect block, and/or sampling rate. The haptic effect header can include other information such as a block order identifier that identifies the position of the haptic effect block relative to other haptic silence blocks and haptic effect blocks, which can be used to order the blocks if transmitted, received, or stored out of order. The haptic effect header can include other information such as destination information that identifies a particular haptic output device and/or component of the haptic output device, which is the intended target of the haptic effect block. One skilled in the art will realize that a haptic effect header can include any other information that identifies, orders, and/or directs the haptic effect block. Each haptic effect block also includes haptic data. The haptic data includes the specific values of the haptic data or haptic signal, from the haptic effect chunk, defined by the associated haptic effect header.

In embodiments, the encoded haptic track 173 can include a track header for the entire encoded haptic track 173. The track header can include metadata and/or meta information on the encoded haptic track 173 that describes the size, structure, details, and any information required to decode and/or play the encoded haptic track 173. For example, the track header can include metadata and/or meta information such as number of segments in the encoded haptic track 173 (e.g., number of haptic silence chunks, number of haptic effect chunks, etc.), haptic effect threshold, maximum amplitude, total length of the encoded haptic track 173 (e.g., total playing time, total amount of data, etc.), playback rate, sampling rate, and the like.

Figure 5:
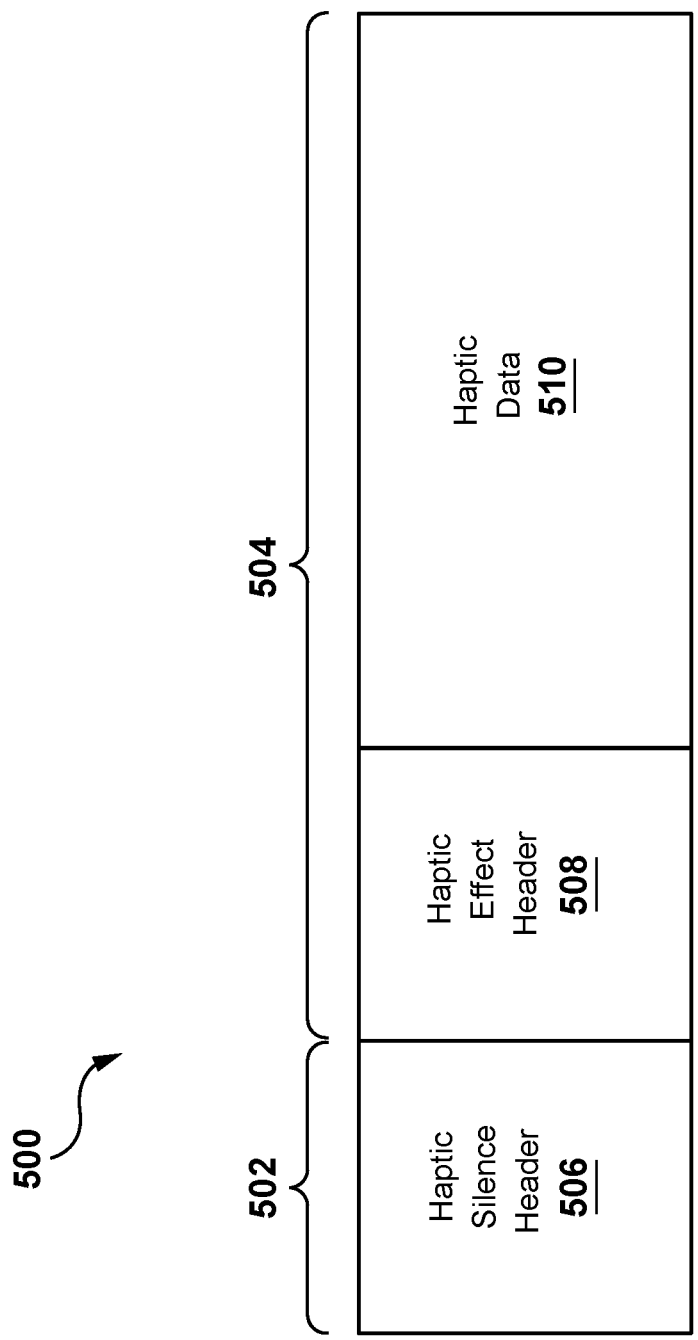
FIG. 5 is a diagram illustrating an exemplary format of an encoded haptic track for use in the operation of the encoding system of FIG. 3, according to an embodiment in accordance herewith.

FIG. 5 illustrates an example of a format 500 for encoding a haptic track in accordance with an embodiment hereof. One skilled in the art will realize that FIG. 5 illustrates one example of an encoding format and that the haptic tracks may be encoding using other formats or configurations of haptic data.

As illustrated in FIG. 5, the format 500 compresses a haptic track based on haptic silences and/or haptic effects. The format 500 can define a haptic silence block 502 and a haptic effect block 504. The haptic silence block 502 includes a haptic silence header 506. The haptic silence header 506 can include an identification of the type of haptic effect, e.g., haptic silence or haptic effect, the number of samples, and the sampling rate. In an embodiment, the haptic silence header 502 can take the form: [TYPE]: [NUMBER OF SAMPLES]:[SAMPLING RATE]. For example, for a silence block of two (2) sample at a sampling rate of five (5) milliseconds, the haptic silence header 502 can be "S:2:5," where S represents a silence type In an embodiment, the haptic silence block 502 includes only the header and does not include a data block. That is, because the haptic silence header 502 represents a silence, e.g., no haptic effect or corresponding data, no data block is required.

The haptic effect block 504 includes a haptic effect header 508 and haptic data 510. The haptic effect header 508 can include an identification of the type of haptic effect, e.g., haptic silence or haptic effect, the number of samples, and the sampling rate. In an embodiment, the haptic effect header 508 can take the form: [TYPE]:[NUMBER OF SAMPLES]: [SAMPLING RATE]. For example, for a haptic effect block of nine (9) samples at a sampling rate of five (5) milliseconds, the haptic effect header 508 can be "E:9:5." In an embodiment, the haptic effect header 508 can identify a particular type of haptic effect. For example, for a haptic effect block for a vibration haptic effect of nine (9) samples at a sampling rate of five (5) milliseconds, the haptic effect header 508 can be "V:9:5," where V represents a vibration haptic effect.

The haptic data 510 can include the specific values of the haptic data defined by the preceding haptic effect header 508. For example, for a vibration haptic effect of nine (9) haptic samples at a sampling rate of five (5) milliseconds, the haptic data 510 can include data associated with (e.g., the specific value of) each of the 9 haptic samples. The specific value of each of the 9 haptic samples represents a haptic effect to be performed for a time period specified by the sampling rate. For example, if the haptic effect represented in the haptic data is a vibration haptic effect, the value of each of the 9 samples may be a magnitude of the vibration, e.g., a higher value representing a higher magnitude vibration and a lower value representing a lower magnitude vibration.

Returning to FIG. 3, the identification module 153 can perform a single examination of the haptic track 171 to identify the haptic silence chunks and/or the haptic effect chunks. In some embodiments, the identification module 153 can perform multiple examinations of the haptic track 171 to identify the haptic silence chunks and/or the haptic effect chunks. In some embodiments, the identification module 153 can perform multiple examinations of the haptic track 171 using different haptic effect thresholds.

In an embodiment, a haptic effect block may have a predetermined size that limits in the number of portions (e.g., haptic samples) that can be encoded in a single haptic effect block. For example, the haptic effect block 504 can include a predetermined size limit on the number of samples or time period encoded in a single haptic effect block 504. For example, if the haptic effect block 504 has a limit of eighteen (18) haptic samples, a haptic effect that spans thirty-six (36) haptic samples can be broken into two (2) sequentially positioned haptic effect blocks 504. For instance, a first haptic effect block 504, with a haptic effect header 508 and haptic data 510, can encode 18 samples, and a second haptic effect block 504, with a haptic effect header 508 and haptic data 510, can encode 18 samples.

In some cases, during a single identification using the haptic effect threshold, the encoding system 100 may identify haptic effect chunks that include a number of haptic samples that exceeds the predetermined size limit of a haptic effect block. For example, as illustrated in FIG. 4A, if the identification module 153 utilizes a first threshold of 0.0 magnitude for the haptic track 400, the identification module 153 (and the segmenting module 155) may identify a haptic effect chunk 414 that includes twenty-one (21) samples, which may exceed the predetermined size limit of the haptic effect block, e.g., haptic effect block 504. In embodiments, if the segmenting module 155 identifies a haptic effect chunk that exceeds a predetermined size, the identification module 153 and the segmenting module 155 can reexamine the haptic track 171 in order to determine new silence effect chunks and/or haptic effect chunks and/or further subdivide the haptic effect chunks that exceed the predetermined size limit.

In some embodiments, the identification module 153 can select a new haptic effect threshold and reexamine the entire haptic track 171. For example, the identification module 153 can select the new haptic effect threshold by increasing the previous haptic effect threshold by a predetermined or arbitrary amount. Likewise, for example, the identification module 153 can examine each sample in the haptic track 171 and set the new haptic effect threshold at a value larger than the sample with the lowest value. The identification module 153 can examine the haptic track 171 with the new haptic effect threshold and classify the haptic track 171 into new haptic silence chunks and new haptic effect chunks. The identification module 153 and the segmenting module 155 can iteratively repeat this process until haptic silence chunks and haptic effect chunks meet the predetermined sizes.

In some embodiments, the identification module 153 and the segmenting module 155 can examine and sub-divide the haptic effect chunks that exceed the predetermined size limit. The identification module 153 and the segmenting module 155 can examine the haptic effect chunk, which exceeds the predetermined size limit, and determine one or more locations within the haptic effect chunk at which to sub-divide the haptic effect chunk into multiple smaller haptic effect chunks. In an embodiment, the identification module 153 and the segmenting module 155 can determine the location in order to reduce the effect of the division on the overall intent of the haptic track 171 (or chunk being subdivided.)

For example, the identification module 153 can select a new haptic effect threshold by increasing the previous haptic effect threshold by a predetermined or arbitrary amount. Likewise, for example, the identification module 153 can examine the specific haptic effect chunk that is too large and set the new haptic effect threshold at a value larger than the sample with the lowest value. For instance, as illustrated in FIG. 4C, the identification module 153 can examine the haptic effect chunk 414 to identify a sample with the lowest magnitude, e.g., haptic sample 415 and set a new haptic effect threshold 416 at a value at or slightly larger than the lowest magnitude. The identification module 153 can compare the samples the haptic effect chunk 414 to the new haptic threshold 416 and identify locations of lowest magnitude samples. The segmenting module 155 can then select one or more locations at which to subdivide the haptic effect chunk 414 into smaller chunks. For example, the segmenting module 155 can subdivide the haptic effect chunk 414 at the haptic sample 415 into new haptic effect chunks 417 and 418.

In some embodiments, if one of the subdivided haptic effect chunks still exceeds the predetermined size limit, the subdivision process can be performed again with a new haptic threshold. For example, referring to FIG. 4D, if haptic effect chunk 417 exceeds the predetermined size limit after subdivision, the identification module 153 and segmenting module 155 can select a new threshold and subdivide the haptic effect chunk 414 into new haptic effect chunks. In some embodiments, if one of the subdivided haptic effect chunks still exceeds the predetermined size limit, the subdivision process can be performed iteratively on the subdivided haptic effect chunk until all the haptic effect chunks satisfy, meet, and/or fall within the predetermined size limit. For example, referring to FIG. 4D, if haptic effect chunk 417 exceeds the predetermined size limit after subdivision, the identification module 153 and segmenting module 155 can select a new threshold and subdivide the haptic effect chunk 417 further.

In some embodiments, once a haptic effect chunk has been subdivided, the identification module 153 and segmenting module 155 can examine the subdivided haptic effect chunks and recombine segments. For example, if a haptic effect chunk is subdivided into multiple haptic effect chunks, the identification module 153 and segmenting module 155 can examine the subdivided haptic effect chunks and determine if one or more of the subdivided haptic effect chunks can be recombined and still satisfy, meet, and/or fall within the predetermined size limit.

Figure 4E:
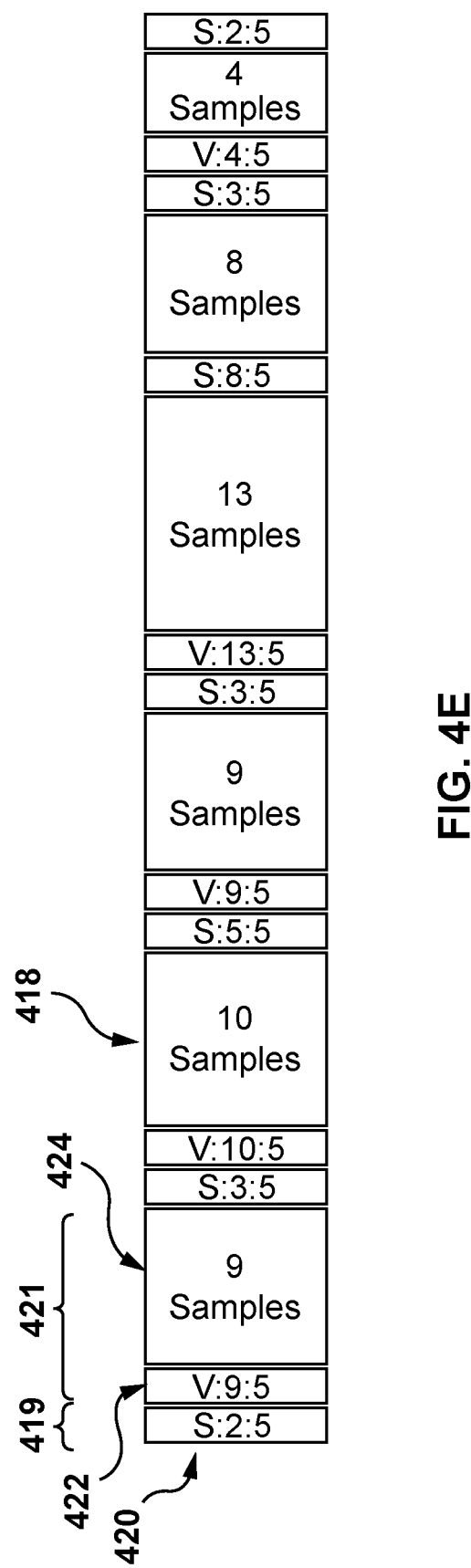

FIG. 4E illustrates an encoded haptic track 418 encoded using the format 500 on the haptic track 400. As illustrated in FIG. 4E, the encoded haptic track 418 includes a haptic silence block 419 that encodes the haptic silence chunk 410. The haptic silence block 419 include a haptic silence header 420 "S:2:5" that defines the haptic silence chunk 410. Likewise, the encoded haptic track 418 include a haptic effect block 421 that encodes the haptic effect chunk 412. The haptic effect block 421 includes a haptic effect header "V:9:5" and haptic data 424, e.g., the magnitude values of the 9 samples from the haptic effect chunk 412.

Once the encoded haptic track 173 is generated, the encoded haptic track 173 is passed to the output module 159. The output module 159 is configured to output the encoded haptic track 173. In an embodiment, the output module 159 can be configured to provide or transmit the encoded haptic track 173 to the playback system 200. In an embodiment, the output module 159 can be configured to store the encoded haptic track 173 in storage, e.g., the storage system 190. For example, the output module 159 can include a user interface in which a user and/or user device can receive or retrieve the encoded haptic tracks 173. Likewise, for example, the output module 159 can include an API that can be called by other modules, software, application, and devices to invoke the operations of the encoding system 100. Additionally, for example, the output module 159 can include a network interface for communicating with the one or more haptic sources over a network. Also, for example, the output module 159 can include a database and/or storage interface for retrieving the encoded haptic tracks 173 from a storage system, storage device, and/or data structure.

Figure 6:
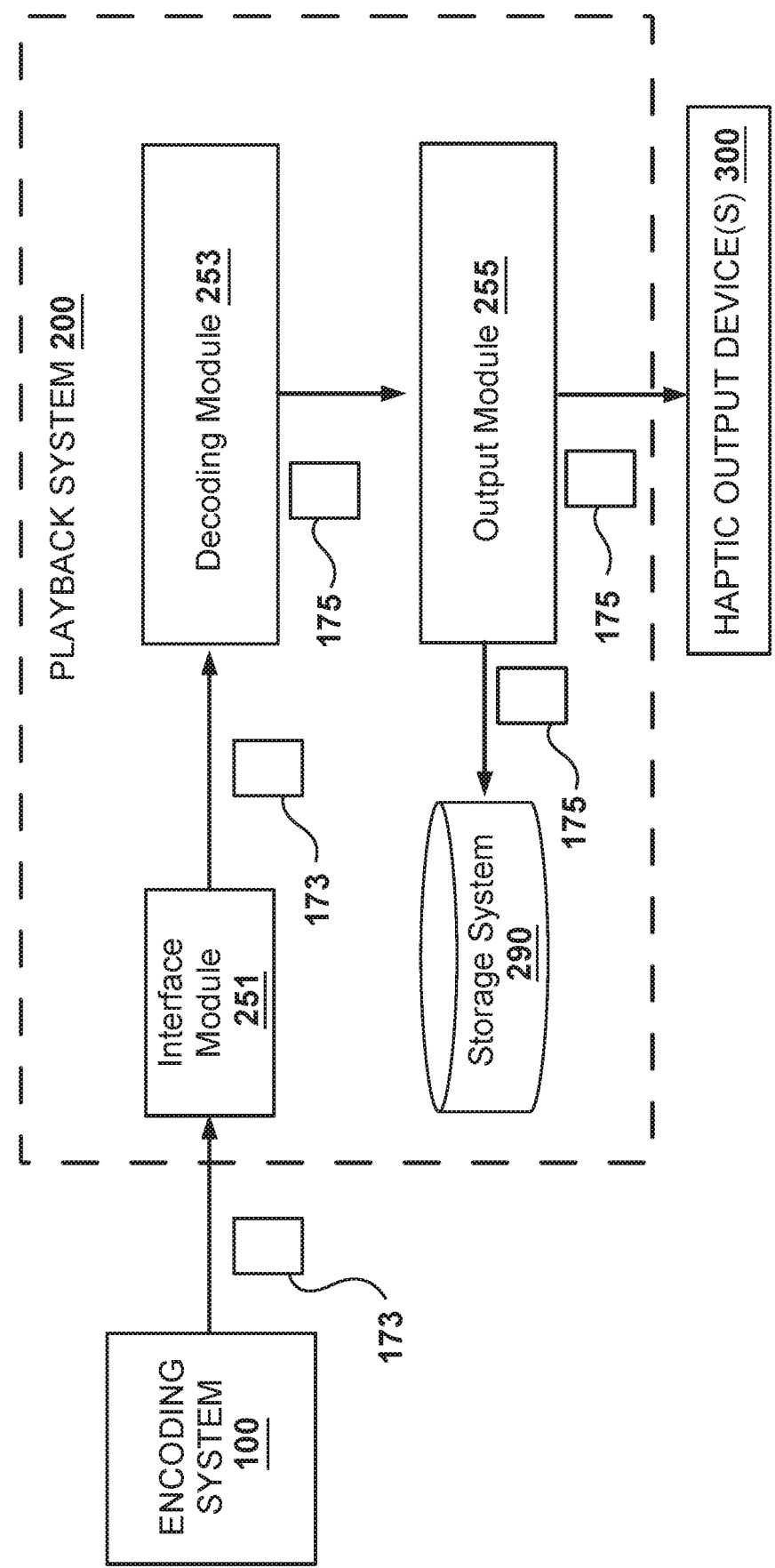
FIG. 6 is a diagram illustrating operation of a playback system in the haptic system of FIG. 1, according to an embodiment in accordance herewith.

FIG. 6 is a diagram illustrating the operation of the playback system 200 in accordance with an embodiment hereof. One skilled in the art will realize that FIG. 6 illustrates one example of the operation of a playback system and that existing components illustrated in FIG. 6 may be removed and/or additional components may be added to the playback system 200, and existing operations may be removed and/or additional operations may be added to the operations illustrated.

As illustrated in FIG. 6, the playback system 200 is configured to receive the encoded haptic track 173 from the encoding system 100, via the interface module 251. For example, the interface module 251 can include a user interface in which a user and/or user device can provide the encoded haptic track 173. Likewise, for example, the interface module 251 can include an API that can be called by other modules, software, application, and devices, for example, the encoding system 100, to invoke the operations of the playback system 200. Additionally, for example, the interface module 251 can include a network interface for communicating with the encoding system 100 over a network. Also, for example, the interface module 251 can include a database and/or storage interface for retrieving the encoded haptic track 173 from a storage system, storage device, and/or data structure.

Once received, the interface module 251 is configured to pass the encoded haptic track 173 to the decoding module 253. The decoding module 253 is configured to decode the encoded haptic track 173 and generate a haptic signal 175 for use by, for example, the haptic output devices 300. In embodiment, the decoding module 253 is configured to read the haptic silence blocks and the haptic effect blocks of the encoded haptic tracks 173 and to generate the haptic signal 175 from the haptic silence blocks and the haptic effect blocks.

For example, with reference to the example of FIG. 4E, a decoding module 253 can begin by reading an encoded haptic track 418. The decoding module 253 first reads a haptic silence block 419 with a haptic silence header 420. In response, the decoding module 253 generates a haptic signal 175 that corresponds to no haptic effect, e.g., a signal with no magnitude value or a signal to sleep, with a time period and sampling rate defined in the haptic silence header 420. Then, the decoding module 253 reads a haptic effect block 421 with a haptic effect header 422 and haptic data 424. In response, the decoding module 253 generates a haptic signal 175 that corresponds and includes haptic samples corresponding to the haptic data 424 for the sampling rate specified in the haptic effect header 422.

Once the haptic signal 175 is generated, the haptic signal 175 is passed to the output module 255. The output module 255 is configured to output the haptic signal 175. In an embodiment, the output module 255 can be configured to provide or transmit the haptic signal 175 to the haptic output devices 300. In an embodiment, the output module 255 can be configured to store the haptic signal 175 in storage, e.g., the storage system 290. For example, the output module 255 may include an API that can be called by other modules, software, application, and devices to invoke the operations of the playback system 200. Additionally, for example, the output module 255 may include a network interface for communicating with the haptic output devices 300 over a network. Likewise, for example, the output module 255 may include a communication interface, e.g., serial bus, Bluetooth, WIFI, NFC, or any other communication technology, for communicating (wired or wirelessly) with the haptic output device 300. Also, for example, the output module 255 may include a database and/or storage interface for retrieving the haptic signal 175 from a storage system, storage device, and/or data structure.

Figure 7:
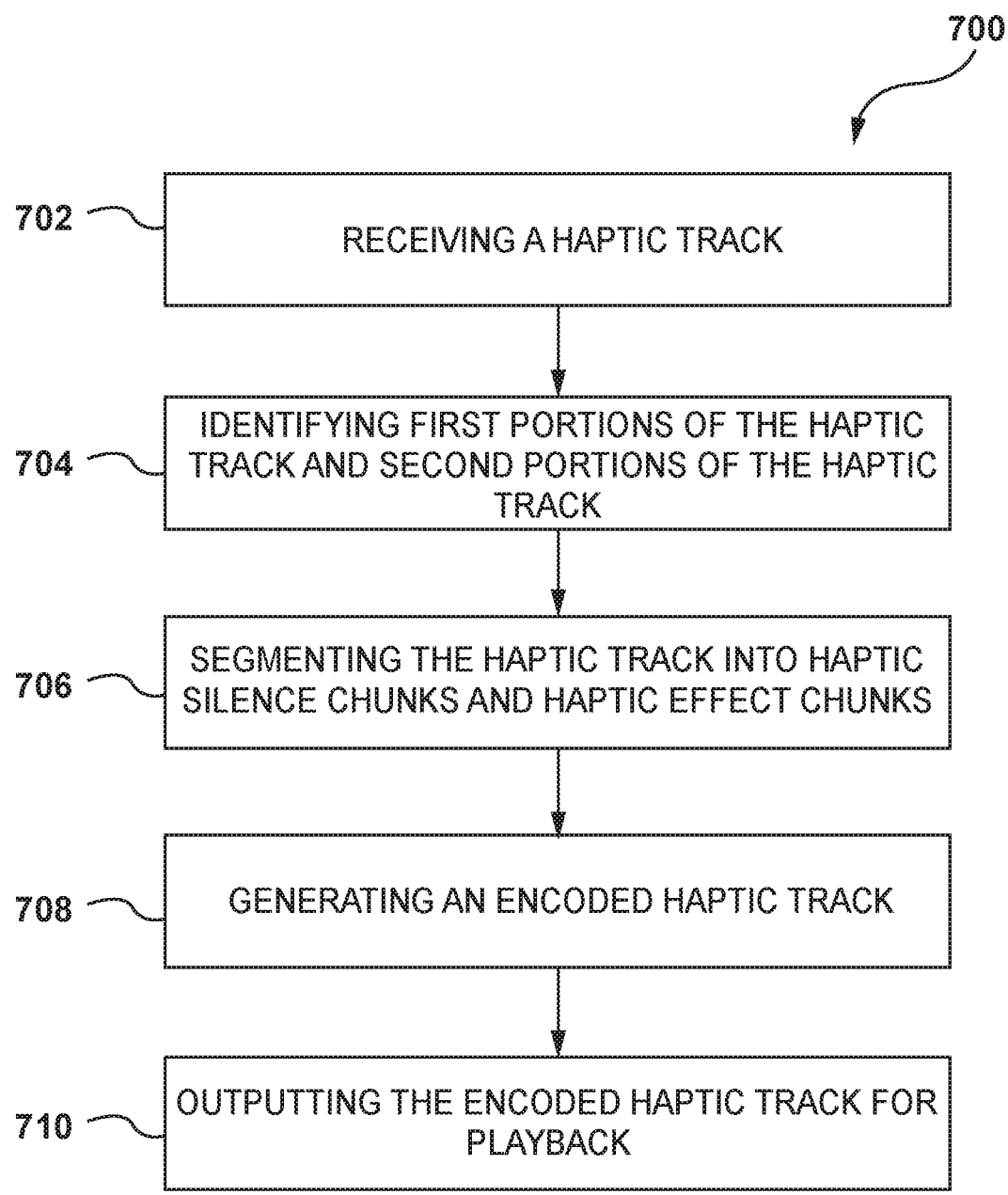
FIG. 7 illustrates a method of encoding a haptic track, according to an embodiment in accordance herewith.

FIG. 7 is a flow chart showing a method of receiving and encoding a haptic track. The process 700 is performed on a computer system having one or more physical processors programmed with computer program instructions that, when executed by the one or more physical processors, cause the computer system to perform the method. The one or more physical processors are referred to below as simply the processor. In embodiments, the process 700 is carried out via the encoding system 100 as described herein. The encoding system 100 represents an example of a hardware and software combination configured to carry out the process 700, but implementations of the process 700 are not limited to hardware and software combination of the encoding system 100. Additional details regarding each of the operations of the method may be understood according to the description of haptic system 10, as described above.

In an operation 702, the process 700 includes receiving a haptic track. In an embodiment, the haptic track can be received from one or more haptic sources 170. The haptic track can include a plurality of haptic effects represented by a haptic signal configured to cause a haptic output device to output the plurality of haptic effects over time.

In an operation 704, the process 700 includes identifying first portions of the haptic track and second portions of the haptic track. The first portions of the haptic track can be representative of haptic silences and the second portions can be representative of haptic effects. In an embodiment, the identification can be performed by an identification module 153 of the encoding system 100.

For example, the identification module 153 can examine and identify which portions of the haptic track 171 can be classified as a haptic silence and which portions of the haptic track 171 can be classified as a haptic effect. The identification module 153 can identify the haptic silence and the haptic effect by comparing each sample in the haptic track 171 to a haptic effect threshold. The haptic effect threshold represents a predetermined value of the haptic sample which can represent a haptic effect.

In an operation 706, the process 700 includes segmenting the haptic tracks into haptic silence chunks and haptic effect chunks. The haptic silence chunks can correspond to one or more of the first portions that are sequentially positioned in the haptic track. The haptic effects chunks can correspond to one or more of the second portions that are sequentially positioned in the haptic track. In an embodiment, the segmenting can be performed by a segmenting module 155 of the encoding system 100.

For example, the segmenting module 155 can splice the haptic track 171 into haptic silence chunks and haptic effect chunks. The segmenting module 155 can group sequentially positioned haptic samples that are classified as haptic silences as a haptic silence chunk. The segmenting module 155 can group sequentially positioned haptic samples that are classified as haptic effects as a haptic effect chunk.

In an operation 708, the process 700 includes generating an encoded haptic track. The encoded haptic track can include at least one haptic silence block and at least one haptic effect block. The at least one haptic silence block can be representative of at least portion of a haptic silence chunk from the haptic silence chunks. The at least one haptic effect block can be representative of at least a portion of a haptic effect chunk from the haptic effect chunks. In an embodiment, the generation can be performed by a packaging module 157 of the encoding system 100.

For example, the packaging module 157 can encode (or "package") the haptic silence chunks and the haptic effects chunks into the encoded haptic track 173. To encode the haptic silence chunks and the haptic effect chunks, the packaging module 157 can utilize an encoding format that is based on the haptic silence chunks and haptic effect chunks. The format of the encoded haptic tracks 173 includes haptic silence blocks, each containing a haptic silence header, and haptic effect blocks, each containing a haptic effect header and haptic data, for example, as illustrated in FIG. 5.

In an operation 710, the process 700 includes outputting the encoded haptic track for playback. In an embodiment, the output can be performed by an output module 159 of the encoding system 100.

The above describes an illustrative flow of an example process 700 of receiving haptic streams and playing back the haptic effects encoded therein. The process as illustrated in FIG. 7 is exemplary only, and variations exist without departing from the scope of the embodiments disclosed herein. The steps may be performed in a different order than that described, additional steps may be performed, and/or fewer steps may be performed.

Figure 8:
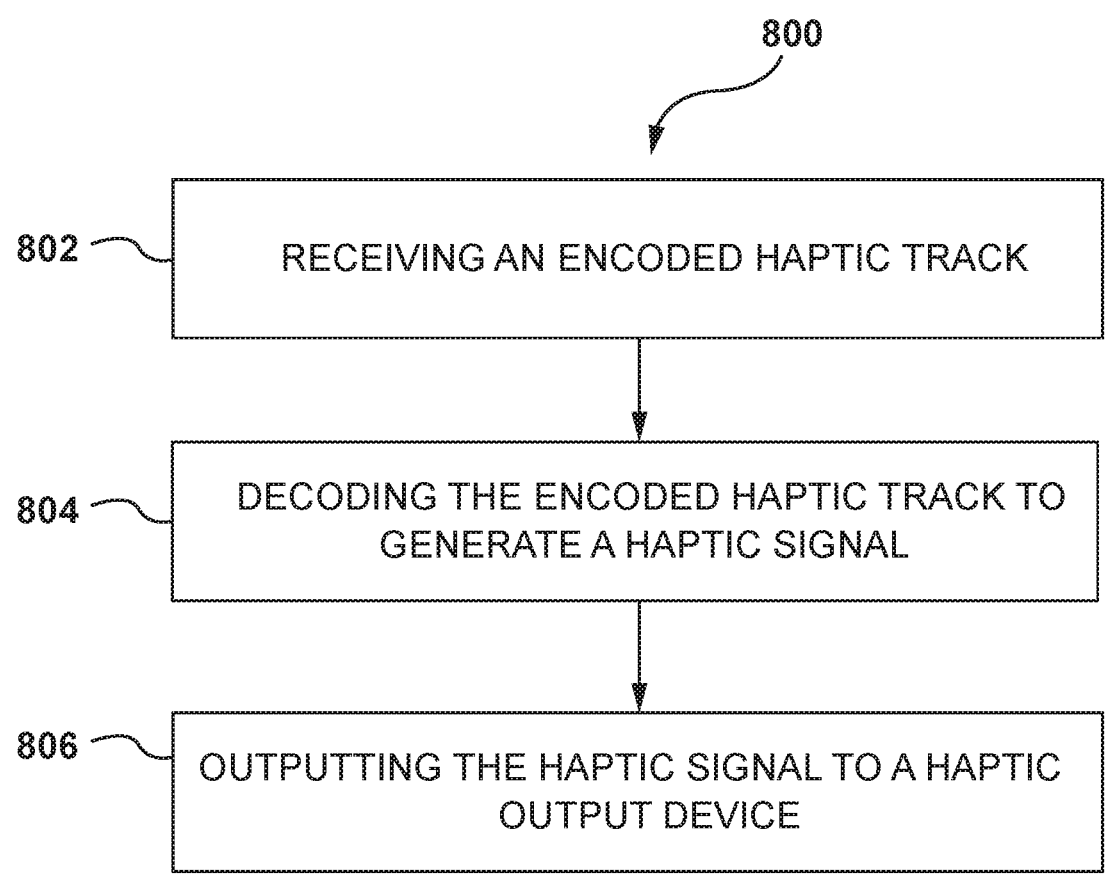
FIG. 8 illustrates a method of decoding an encoded haptic track, according to an embodiment in accordance herewith.

FIG. 8 is a flow chart showing a method of receiving and decoding an encoded haptic track for playback. The process 800 is performed on a computer system having one or more physical processors programmed with computer program instructions that, when executed by the one or more physical processors, cause the computer system to perform the method. The one or more physical processors are referred to below as simply the processor. In embodiments, the process 800 is carried out via a playback system 200 as described herein. The playback system 200 represents an example of a hardware and software combination configured to carry out the process 800, but implementations of the process 800 are not limited to hardware and software combination of the playback system 200. Additional details regarding each of the operations of the method may be understood according to the description of haptic system 10, as described above.

In an operation 802, the process 800 includes receiving an encoded haptic track. In an embodiment, the encoded haptic track can be received from the encoding system 100 and/or other computer systems. For example, the encoded haptic track can be included in a media stream that is intended for playback on a playback system 200. In another embodiment, the encoded haptic track can be retrieved from storage, whether local to the playback system 200 or remotely located. In an embodiment, the receiving can be performed by an interface module 251 of the playback system 200.

In an operation 804, the process 800 includes decoding the encoded haptic track to generate a haptic signal. In an embodiment, the decoding can be performed by a decoding module 253 of the playback system 200. For example, the playback system 200 reads the haptic silence blocks and the haptic effect blocks of the encoded haptic tracks 173 and generates the haptic signal 175 from the haptic silence blocks and the haptic effect blocks.

For example, the decoding module 253 can begin reading the encoded haptic tracks 173 sequentially. When the decoding module 253 reads a haptic silence block, the decoding module 253 can generates a haptic signal 175 that corresponds to no haptic effect, e.g., a signal with no magnitude value or a signal to sleep, with a time period and a sampling rate defined in the haptic silence header. When the decoding module 253 reads a haptic effect block, the decoding module 253 generates a haptic signal 175 that includes haptic samples corresponding to the haptic data in the haptic effect block for the sampling rate specified in the haptic effect header. The decoding module 253 can continue reading the encoding haptic tracks 173 and generating the haptic signal 175 until an end of the encoding haptic tracks are reached.

In an operation 806, the process 800 includes outputting the haptic signal to a haptic output device. In an embodiment, an output module 255 can be performed by the output module 255 of the playback system 200. In an embodiment, the decoding module 253 can send the haptic signal 175 to the output module 255, in real time, as the haptic track is decoded. In response, the output module 255 can send the haptic signal 175 to the haptic output devices 300, in real time.

In another embodiment, the decoding module 253 can send a complete haptic signal 175 to the output module 255 once the encoded haptic track 173 is decoded. Then, the output module 255 can send the haptic signal 175 to the haptic output devices 300 at an appropriate time when the haptic track is to be played.

The above describes an illustrative flow of an example process 800 of receiving haptic streams and playing back the haptic effects encoded therein. The process as illustrated in FIG. 8 is exemplary only, and variations exist without departing from the scope of the embodiments disclosed herein. The steps may be performed in a different order than that described, additional steps may be performed, and/or fewer steps may be performed.

The above described systems, devices, and/or methods provide various advantages for encoding, streaming, and/or playback of haptic tracks. The described systems, devices, and/or methods avoid producing either gaps or extraneous items in the haptics which are not present in the original track. For example, if a continuous haptic effect is broken into two separate data blocks, an unintended skip, gap, and/or silence may be introduced due to the playback system and/or haptic output device reading and decoding the two separate data blocks. The described systems, devices, and/or methods avoid extraneous gaps and items by dividing and encoding the haptic tracks by haptic silence blocks and haptic effect blocks, thereby preventing gaps, skips, and/or silences due to the format of the encoding process. By encoding the haptic silences and haptic effects in separate blocks, the described systems, devices, and/or methods can maintain the intent of the haptic effects of the haptic track once encoded. Likewise, by reducing haptic silences to only header information, the encoding performed by the described systems, devices, and/or methods compresses the size of a haptic track for storage or transmission. For example, while 70% of a haptic track may be haptic silences, the encoding of the described systems, devices, and/or methods can produce haptic silence blocks of uniform size regardless of the length of the haptic silences, e.g., the information required to encode a long silence is the same as a short silence. Thus, by reducing the amount of data required to represent a long haptic silence, the described systems, devices, and/or methods can compress a haptic track without losing information. Additionally or alternatively, the encoding of the described systems, devices, and/or methods is universal and can be applied to different types of haptic tracks. For example, because the encoding is variable rate and the rate is encoded directly in the signal (e.g., and can vary for a single haptic track), the described systems, devices, and/or methods can effectively encode haptic effects of different fidelity such as standard definition (SD) and high definition (HD) effects.

Additional discussion of various embodiments is presented below:

Embodiment 1 is a method of encoding haptic tracks. The method includes receiving a haptic track. The haptic track includes a plurality of haptic effects represented by a haptic signal configured to cause a haptic output device to output the plurality of haptic effects over time. The method also includes identifying, within the haptic track, at least one of first portions of the haptic track that are representative of haptic silences or second portions that are representative of the plurality of haptic effects. Additionally, the method includes segmenting the haptic track into haptic silence chunks associated with (e.g., corresponding to) one or more of the first portions that are sequentially positioned in the haptic track and haptic effects chunks associated with (e.g., corresponding to) one or more of the second portions that are sequentially positioned in the haptic track. Further, the method includes generating an encoded haptic track having at least one of a haptic silence block or a haptic effect block. The haptic silence block is representative of at least a portion of a haptic silence chunk from the haptic silence chunks. The haptic effect block is representative of at least a portion of a haptic effect chunk from the haptic effect chunks. The method includes outputting the encoded haptic track for playback.

Embodiment 2 includes the method of embodiment 1, wherein the first portions of the haptic track and the second portions of the haptic track are associated with (e.g., correspond to) haptic samples in the haptic track.

Embodiment 3 includes the method of embodiment 2, wherein the haptic effect block comprises a haptic effect header including a haptic effect identifier, a sample number, and a sampling rate, and wherein the haptic silence block comprises a haptic silence header including a haptic silence identifier, a sample number, and a sampling rate.

Embodiment 4 includes the method of embodiment 3, wherein the haptic effect block further comprises haptic data, the haptic data comprising values of the haptic samples associated with the second portions identified by the haptic effect header.

Embodiment 5 includes the method of embodiment 4, wherein the values of the haptic samples are associated with (e.g., correspond to) magnitudes of a haptic effect represented by the second portions of the haptic track.

Embodiment 6 includes the method of any of embodiments 1-5, wherein identifying at least one of the first portions or the second portions, further includes: comparing values of the haptic samples in the haptic track to a haptic effect threshold; when a value of at least one haptic sample from the haptic samples does not satisfy (e.g., falls below) the haptic effect threshold, classifying the at least one haptic sample as one of the first portions; and when the value of the at least one haptic sample from the haptic samples satisfies (e.g., meets or exceeds) the haptic effect threshold, classifying the at least one haptic sample as one of the second portions.

Embodiment 7 includes the method of embodiment 6, wherein segmenting the haptic track further includes: determining that a number of the haptic samples included in the haptic effect chunk exceeds a predetermined size limit; and dividing the haptic effect chunk into the at least one portion of the haptic effect chunk and at least one additional portion of the haptic effect chunk.

Embodiment 8 includes the method of embodiment 7, wherein dividing the haptic effect chunk includes: comparing values of the haptic samples in the haptic track to a new haptic effect threshold; and selecting a location to divide the haptic effect chunk based on comparing the values.

Embodiment 9 includes the method of any of embodiments 1-8, wherein outputting the encoded haptic track comprises streaming the encoded haptic track to a playback system or transmitting the encoded haptic track to a haptic output device via a communication channel.

Embodiment 10 includes the method of any of embodiments 1-9 and further includes storing the encoded haptic track in a storage device.

Embodiment 11 includes the method of any of embodiments 1-10 and further includes generating a track header for the encoded haptic track, the track header including metadata for the encoded haptic track.

Embodiment 12 includes the method of any of embodiments 1-11 and further includes decoding the encoded haptic track at a playback system to generate at least a portion of the haptic signal of the haptic track; and outputting the haptic signal to a haptic output device.

Embodiment 13 is a system for encoding haptic tracks. The system includes a memory unit including software instructions and at least one processor configured to execute the software instructions to perform a method encoding the haptic tracks. The method includes receiving a haptic track. The haptic track includes a plurality of haptic effects represented by a haptic signal configured to cause a haptic output device to output the plurality of haptic effects over time. The method also includes identifying, within the haptic track, at least one of first portions of the haptic track that are representative of haptic silences or second portions that are representative of the plurality of haptic effects. Additionally, the method includes segmenting the haptic track into haptic silence chunks associated with (e.g., corresponding to) one or more of the first portions that are sequentially positioned in the haptic track and haptic effects chunks associated with (e.g., corresponding to) one or more of the second portions that are sequentially positioned in the haptic track. Further, the method includes generating an encoded haptic track having at least one of a haptic silence block or a haptic effect block. The haptic silence block is representative of at least a portion of a haptic silence chunk from the haptic silence chunks. The haptic effect block is representative of at least a portion of a haptic effect chunk from the haptic effect chunks. The method includes outputting the encoded haptic track for playback.

Embodiment 14 includes the system of embodiment 13, wherein the first portions of the haptic track and the second portions of the haptic track are associated with (e.g., correspond to) haptic samples in the haptic track.

Embodiment 15 includes the system of embodiment 14, wherein the haptic effect block comprises a haptic effect header including a haptic effect identifier, a sample number, and a sampling rate, and wherein the haptic silence block includes a header including a haptic silence identifier, a sample number, and a sampling rate.

Embodiment 16 includes the system of embodiment 15, wherein the haptic effect block further comprises haptic data, the haptic data comprising values of the haptic samples associated with the second portions identified by the haptic effect header.

Embodiment 17 includes the system of any of embodiments 13-16, wherein the method further includes: comparing values of the haptic samples in the haptic track to a haptic effect threshold; when a value of at least one haptic sample from the haptic samples does not satisfy (e.g., falls below) the haptic effect threshold, classifying the at least one haptic sample as one of the first portions; and when the value of the at least one haptic sample from the haptic samples satisfies (e.g., meets or exceeds) the haptic effect threshold, classifying the at least one haptic sample as one of the second portions.

Embodiment 18 includes the system of any of embodiments 13-18, wherein outputting the encoded haptic track comprises one or more of: streaming the encoded haptic track to a playback device; and storing the encoded haptic track in a storage device; and transmitting the encoded haptic track to a haptic output device via a communication channel.

Embodiment 19 includes the system of any of embodiments 13-19, wherein the at least one processor is further configured to execute the software instructions to: decode the encoded haptic track at a playback system to generate at least a portion of the haptic signal; and output the at least a portion of the haptic signal to a haptic output device.

Embodiment 20 includes a method of decoding haptic tracks is provided. The method includes receiving an encoded haptic track comprising at least one of a haptic silence block or a haptic effect block, wherein the haptic silence block is representative of at least a portion of a haptic silence chunk and the haptic effect block is representative of at least a portion of a haptic effect chunk, the haptic silence chunk representing a portion of a haptic track before encoding that is associated with one or more of haptic silence portions of the haptic track before encoding that are sequentially positioned in the haptic track, and the haptic effect chunk representing a portion of the haptic track before encoding that is associated with one or more of haptic effect portions of the haptic track before encoding that are sequentially positioned in the haptic track, decoding the encoded haptic track at a playback system to generate a haptic signal associated with the haptic track and outputting the haptic signal to a haptic output device.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). While various embodiments according to the present disclosure have been described above, it should be understood that they have been presented by way of illustration and example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. Stated another way, aspects of the above methods of encoding haptic tracks may be used in any combination with other methods described herein or the methods can be used separately. All patents and publications discussed herein are incorporated by reference herein in their entirety.

What is claimed is:

1. A method of encoding haptic tracks, the method comprising:
   receiving a haptic track, the haptic track including a plurality of haptic effects represented by a haptic signal configured to cause a haptic output device to output the plurality of haptic effects over time;
   identifying, within the haptic track, at least one of first portions of the haptic track that are representative of haptic silences or second portions that are representative of the plurality of haptic effects;
   segmenting the haptic track into haptic silence chunks associated with one or more of the first portions that are sequentially positioned in the haptic track and haptic effects chunks associated with one or more of the second portions that are sequentially positioned in the haptic track;
   generating an encoded haptic track comprising at least one of a haptic silence block or a haptic effect block, wherein the haptic silence block is representative of at least a portion of a haptic silence chunk from the haptic silence chunks and the haptic effect block is representative of at least a portion of a haptic effect chunk from the haptic effect chunks; and
   outputting the encoded haptic track for playback.

2. The method of claim 1, wherein the first portions of the haptic track and the second portions of the haptic track are associated with haptic samples in the haptic track.

3. The method of claim 2, wherein the haptic effect block comprises a haptic effect header including a haptic effect identifier, a sample number, and a sampling rate, and
   wherein the haptic silence block comprises a haptic silence header including a haptic silence identifier, a sample number, and a sampling rate.

4. The method of claim 3, wherein the haptic effect block further comprises haptic data, the haptic data comprising values of the haptic samples associated with the second portions identified by the haptic effect header.

5. The method of claim 4, wherein the values of the haptic samples are associated with magnitudes of a haptic effect represented by the second portions of the haptic track.

6. The method of claim 2, wherein identifying at least one of the first portions or the second portions, further comprises:
   comparing values of the haptic samples in the haptic track to a haptic effect threshold;
   when a value of at least one haptic sample from the haptic samples does not satisfy the haptic effect threshold, classifying the at least one haptic sample as one of the first portions; and
   when the value of the at least one haptic sample from the haptic samples satisfies the haptic effect threshold, classifying the at least one haptic sample as one of the second portions.

7. The method of claim 6, wherein segmenting the haptic track further comprises:
   determining that a number of the haptic samples included in the haptic effect chunk exceeds a predetermined size limit; and
   dividing the haptic effect chunk into the at least one portion of the haptic effect chunk and at least one additional portion of the haptic effect chunk.

8. The method of claim 7, wherein dividing the haptic effect chunk comprises:
   comparing values of the haptic samples in the haptic track to a new haptic effect threshold; and
   selecting a location to divide the haptic effect chunk based on comparing the values.

9. The method of claim 1, wherein outputting the encoded haptic track comprises streaming the encoded haptic track to a playback system or transmitting the encoded haptic track to a haptic output device via a communication channel.

10. The method of claim 1, further comprising storing the encoded haptic track in a storage device.

11. The method of claim 1, further comprising:
generating a track header for the encoded haptic track, the track header comprising metadata for the encoded haptic track.

12. The method of claim 1, further comprising
decoding the encoded haptic track at a playback system to generate at least a portion of the haptic signal of the haptic track; and
outputting the haptic signal to a haptic output device.

13. A system for encoding haptic tracks, the system comprising:
a memory unit including software instructions; and
at least one processor configured to execute the software instructions to perform a method comprising:
receiving a haptic track, the haptic track including a plurality of haptic effects represented by a haptic signal configured to cause a haptic output device to output the plurality of haptic effects over time;
identifying, within the haptic track, at least one of first portions of the haptic track that are representative of haptic silences or second portions that are representative of the plurality of haptic effects;
segmenting the haptic track into haptic silence chunks associated with one or more of the first portions that are sequentially positioned in the haptic track and haptic effects chunks associated with one or more of the second portions that are sequentially positioned in the haptic track;
generating an encoded haptic track comprising at least one of a haptic silence block or a haptic effect block, wherein the haptic silence block is representative of at least a portion of a haptic silence chunk from the haptic silence chunks and the haptic effect block is representative of at least a portion of a haptic effect chunk from the haptic effect chunks; and
outputting the encoded haptic track for playback.

14. The system of claim 13, wherein the first portions of the haptic track and the second portions of the haptic track are associated with haptic samples in the haptic track.

15. The system of claim 14, wherein the haptic effect block comprises a haptic effect header including a haptic effect identifier, a sample number, and a sampling rate, and
wherein the haptic silence block includes a haptic silence header including a haptic silence identifier, a sample number, and a sampling rate.

16. The system of claim 15, wherein the haptic effect block further comprises haptic data, the haptic data comprising values of the haptic samples associated with the second portions identified by the haptic effect header.

17. The system of claim 14, wherein identifying at least one of the first portions or the second portions, further comprises:
comparing values of the haptic samples in the haptic track to a haptic effect threshold;
when a value of at least one haptic sample from the haptic samples does not satisfy the haptic effect threshold, classifying the at least one haptic sample as one of the first portions; and
when the value of the at least one haptic sample from the haptic samples satisfies the haptic effect threshold, classifying the at least one haptic sample as one of the second portions.

18. The system of claim 13, wherein outputting the encoded haptic track comprises one or more of:
streaming the encoded haptic track to a playback device;
storing the encoded haptic track in a storage device; and
transmitting the encoded haptic track to a haptic output device via a communication channel.

19. The system of claim 13, wherein the at least one processor is further configured to execute the software instructions to:
decode the encoded haptic track at a playback system to generate at least a portion of the haptic signal; and
output the at least a portion of the haptic signal to a haptic output device.

20. A method of decoding haptic tracks, comprising:
receiving an encoded haptic track comprising at least one of a haptic silence block or a haptic effect block, wherein the haptic silence block is representative of at least a portion of a haptic silence chunk and the haptic effect block is representative of at least a portion of a haptic effect chunk, the haptic silence chunk representing a portion of a haptic track before encoding that is associated with one or more of haptic silence portions of the haptic track before encoding that are sequentially positioned in the haptic track, and the haptic effect chunk representing a portion of the haptic track before encoding that is associated with one or more of haptic effect portions of the haptic track before encoding that are sequentially positioned in the haptic track;
decoding the encoded haptic track at a playback system to generate a haptic signal associated with the haptic track; and
outputting the haptic signal to a haptic output device.

\* \* \* \* \*